United States Patent
Lee et al.

(10) Patent No.: US 10,701,528 B2
(45) Date of Patent: Jun. 30, 2020

(54) METHOD AND APPARATUS FOR PERFORMING PROSE COMMUNICATION IN A WIRELESS COMMUNICATION SYSTEM

(71) Applicant: LG Electronics Inc., Seoul (KR)

(72) Inventors: Ki-Dong Lee, San Diego, CA (US); Sanggook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/461,446

(22) PCT Filed: Nov. 20, 2017

(86) PCT No.: PCT/KR2017/013198
§ 371 (c)(1),
(2) Date: May 16, 2019

(87) PCT Pub. No.: WO2018/093221
PCT Pub. Date: May 24, 2018

(65) Prior Publication Data
US 2019/0349722 A1   Nov. 14, 2019

Related U.S. Application Data

(60) Provisional application No. 62/423,772, filed on Nov. 18, 2016.

(51) Int. Cl.
*H04W 4/16* (2009.01)
*H04W 4/80* (2018.01)
(Continued)

(52) U.S. Cl.
CPC ......... *H04W 4/16* (2013.01); *H04M 3/42059* (2013.01); *H04W 4/40* (2018.02);
(Continued)

(58) Field of Classification Search
CPC ...... H04B 7/2606; H04W 88/02; H04W 4/24; H04W 8/22; H04W 40/10; H04W 88/08;
(Continued)

(56) References Cited

U.S. PATENT DOCUMENTS

2005/0227616 A1\* 10/2005 Takatani ............. H04B 7/2606
455/11.1
2014/0169537 A1\* 6/2014 Sharma ............. H04M 3/53366
379/88.12
(Continued)

FOREIGN PATENT DOCUMENTS

WO   2014077580   5/2014
WO   2015147614   10/2015

*Primary Examiner* — Dai Phuong
(74) *Attorney, Agent, or Firm* — Dentons US LLP

(57) ABSTRACT

Disclosed herein is a method for performing ProSe (Proximity Service) communication a relay terminal and one or more remote terminals wirelessly connected to the relay terminal in a wireless communication system.
The method performed by the relay terminal comprises receiving information related to a destination of a calling signal from a network; receiving, from the network, the calling signal including an identifier (ID) of a calling terminal and an indicator, the indicator indicating which terminal is a final destination; determining whether the information related to the destination of the calling signal is available; and determining the final destination of the calling signal based on the received indicator if the information related to the destination is available.

6 Claims, 11 Drawing Sheets

(51) Int. Cl.
*H04W 4/40* (2018.01)
*H04M 3/42* (2006.01)
*H04W 88/04* (2009.01)
*H04W 92/18* (2009.01)

(52) U.S. Cl.
CPC ............. *H04W 4/80* (2018.02); *H04W 88/04* (2013.01); *H04W 92/18* (2013.01)

(58) Field of Classification Search
CPC ... H04W 88/04; Y02D 70/326; Y02D 70/122; Y02D 70/449; Y02D 70/1242; Y02D 70/144; Y02D 70/22
See application file for complete search history.

(56) References Cited

U.S. PATENT DOCUMENTS

| | | | |
|---|---|---|---|
| 2014/0253666 A1* | 9/2014 | Ramachandran | H04W 4/12 348/14.06 |
| 2016/0219132 A1 | 7/2016 | Lee et al. | |
| 2016/0278154 A1 | 9/2016 | Schmidt et al. | |
| 2016/0330603 A1 | 11/2016 | Chuang | |
| 2018/0084479 A1* | 3/2018 | Kudou | H04W 40/22 |
| 2018/0242381 A1* | 8/2018 | Wei | H04W 76/14 |

* cited by examiner

[Figure 1]
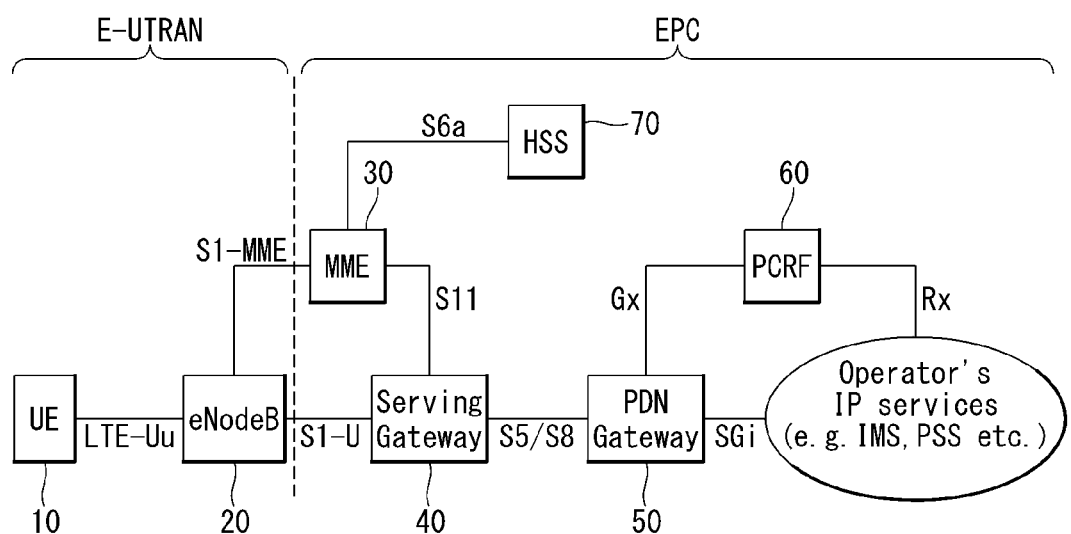

[Figure 2]
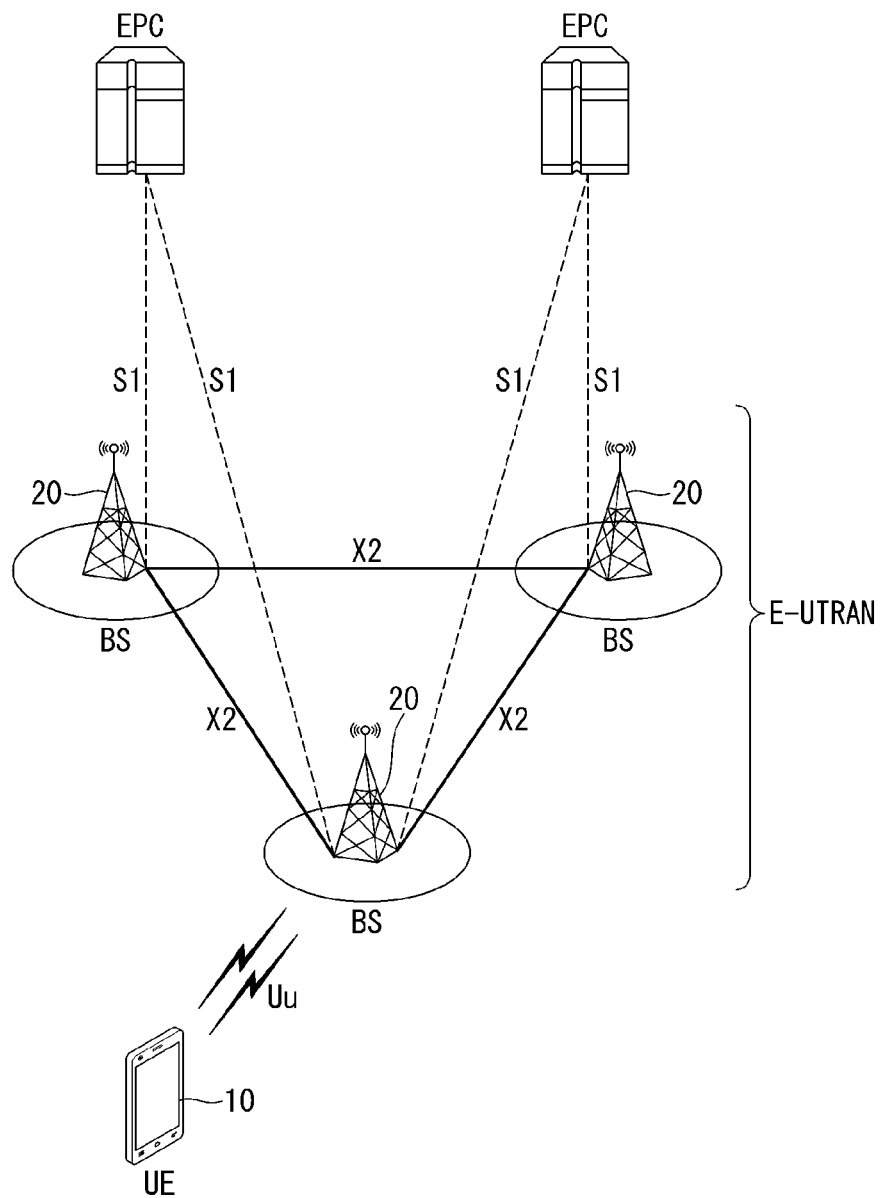

[Figure 3]
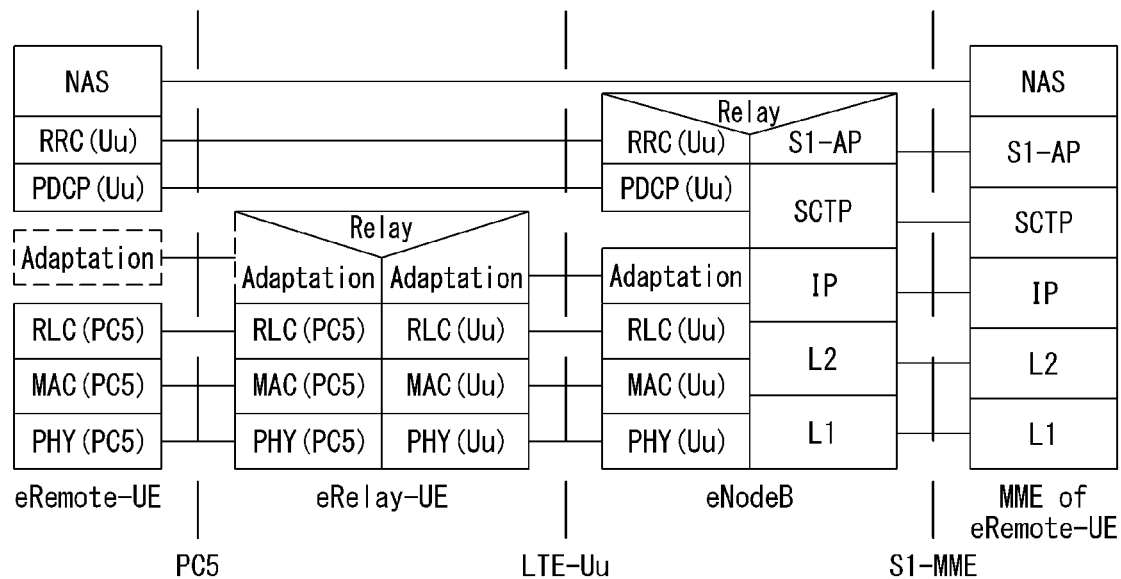
[Figure 4]
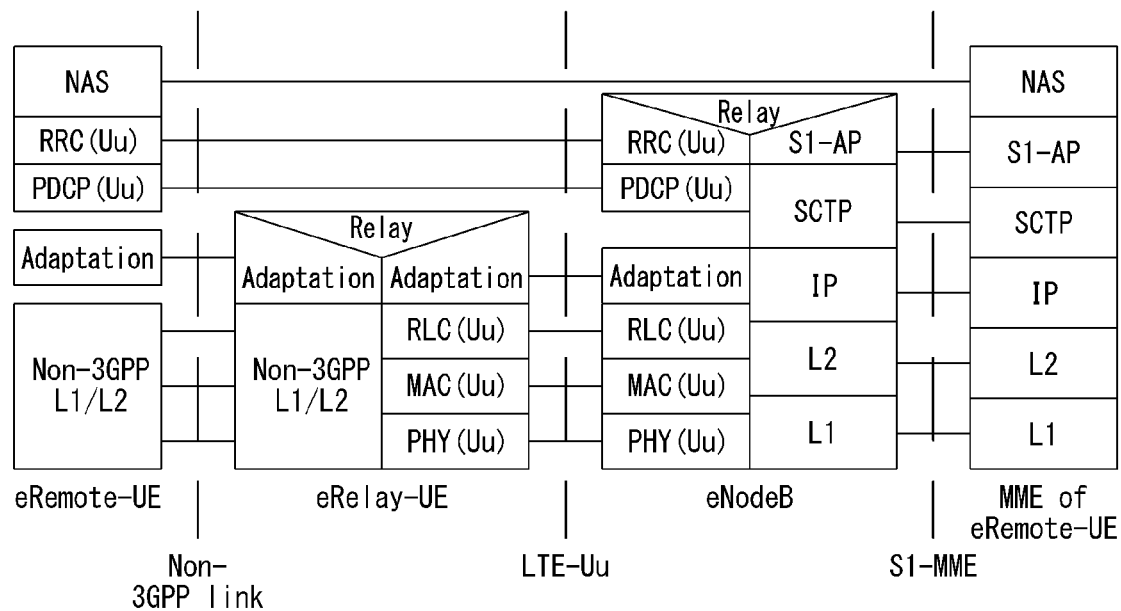

[Figure 5]
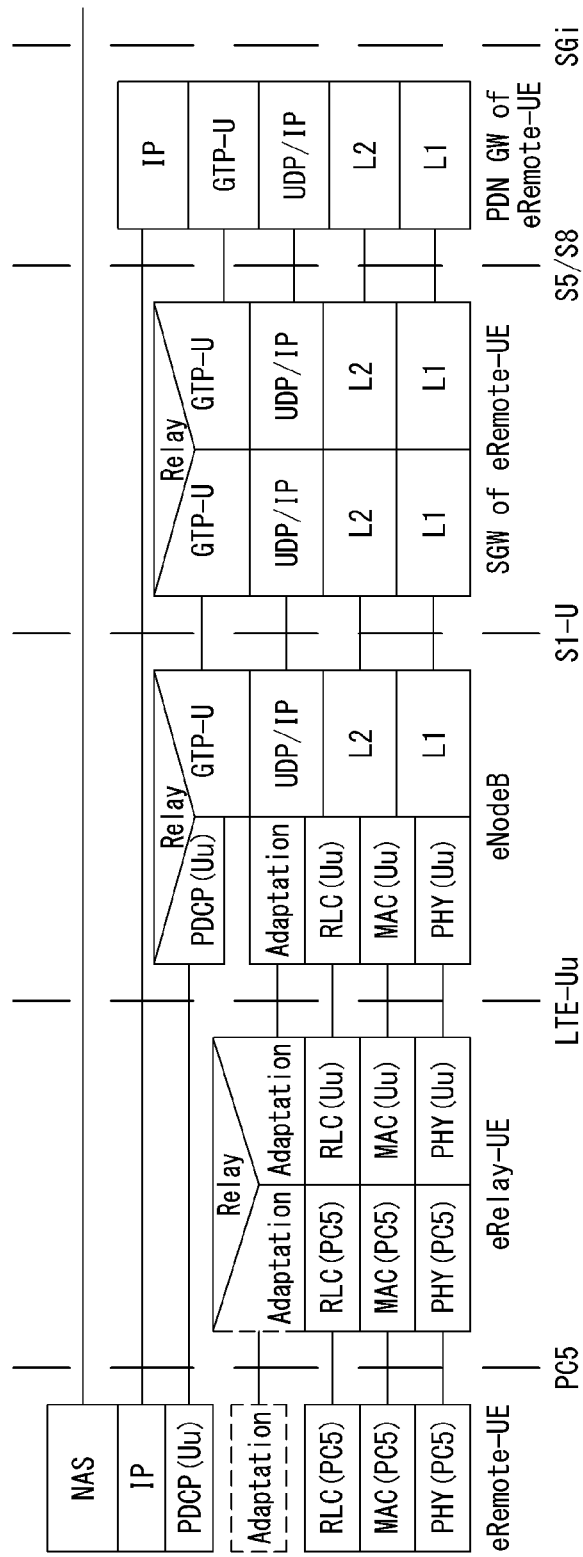

[Figure 6]
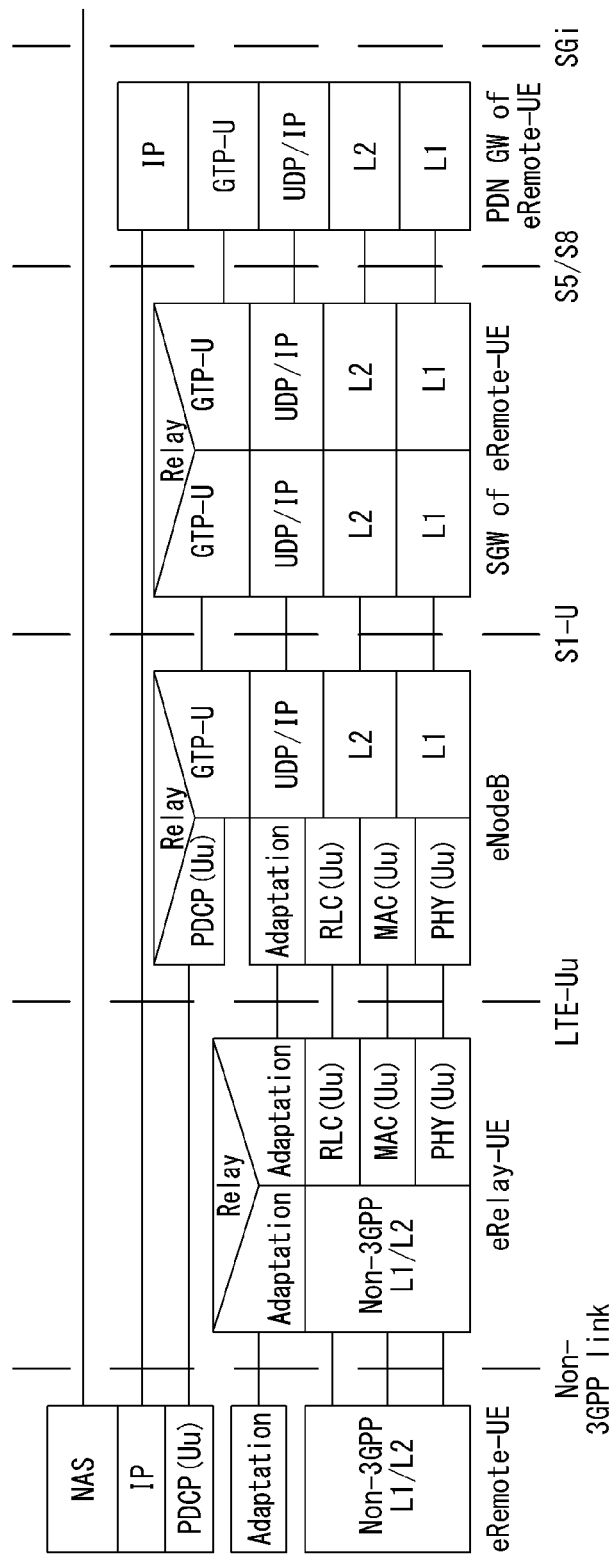

[Figure 7]
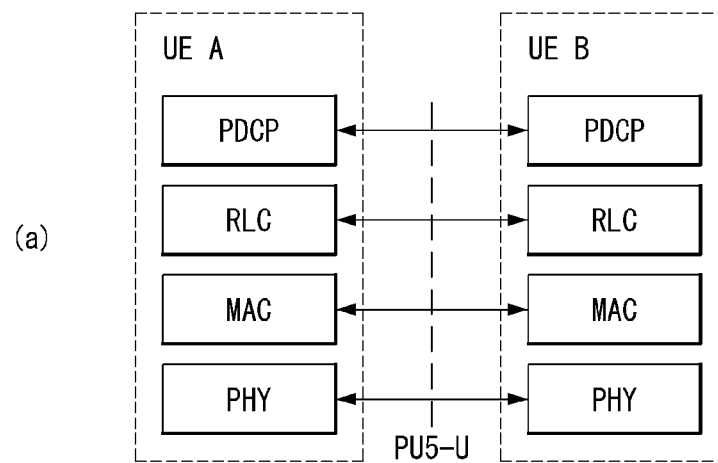
(a)
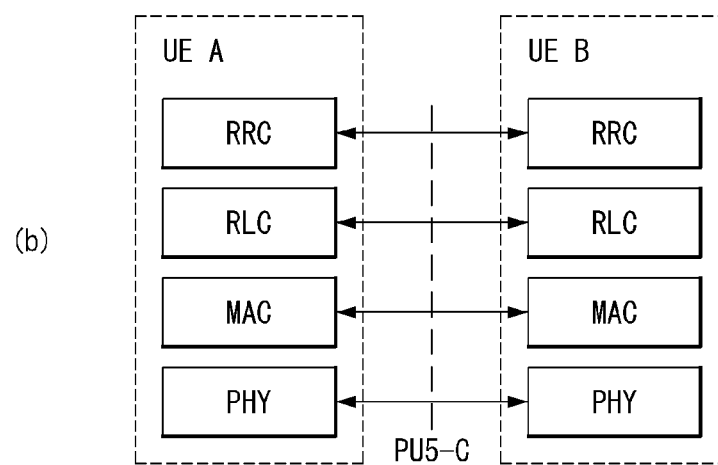
(b)

[Figure 8]
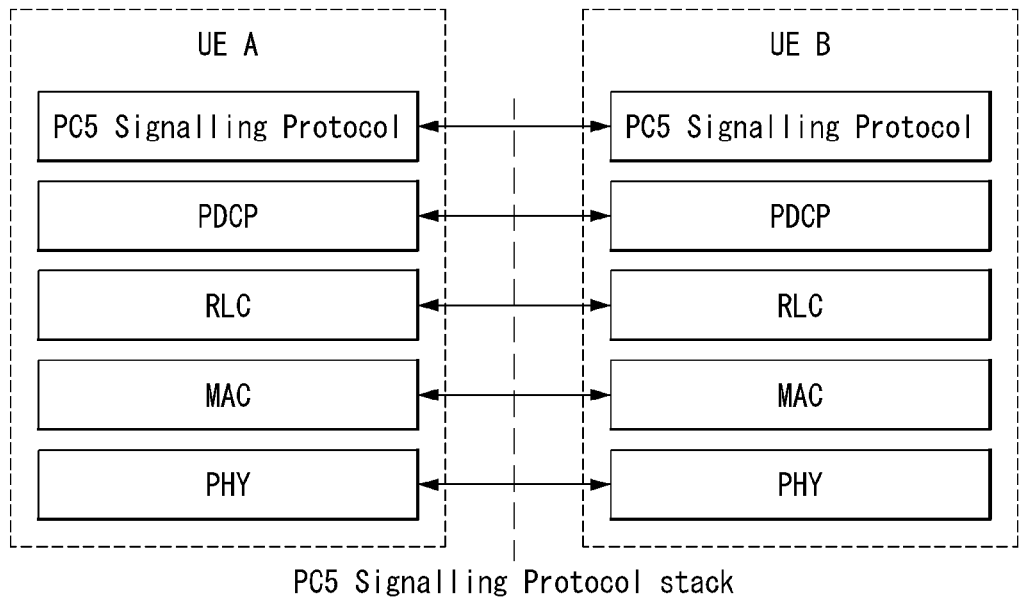
PC5 Signalling Protocol stack
[Figure 9]
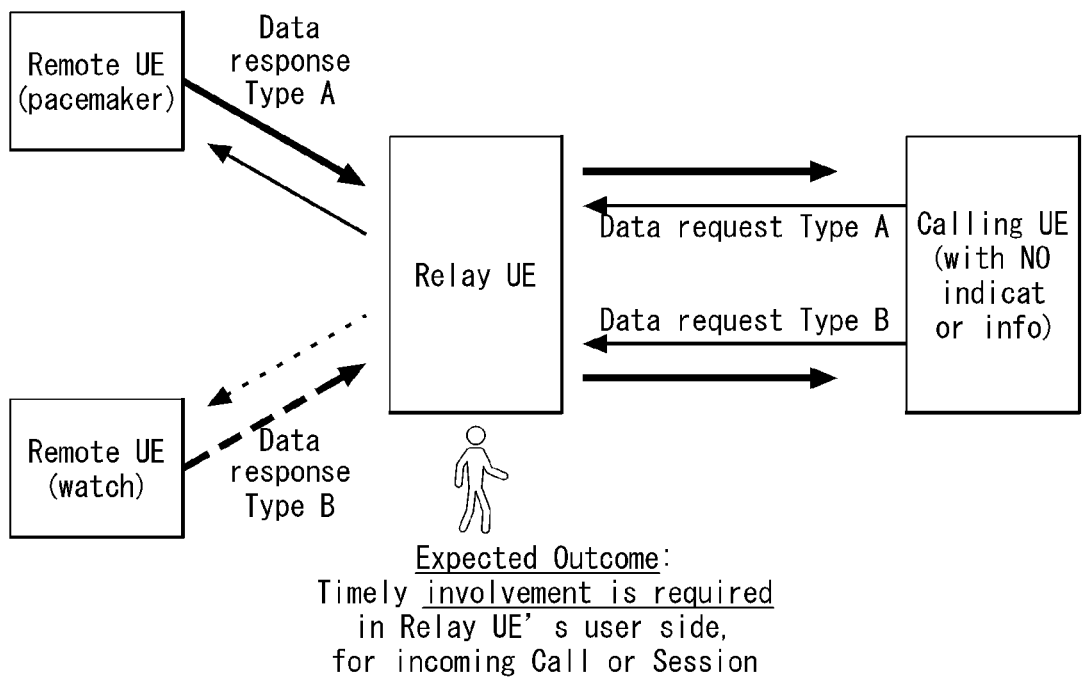

[Figure 10]
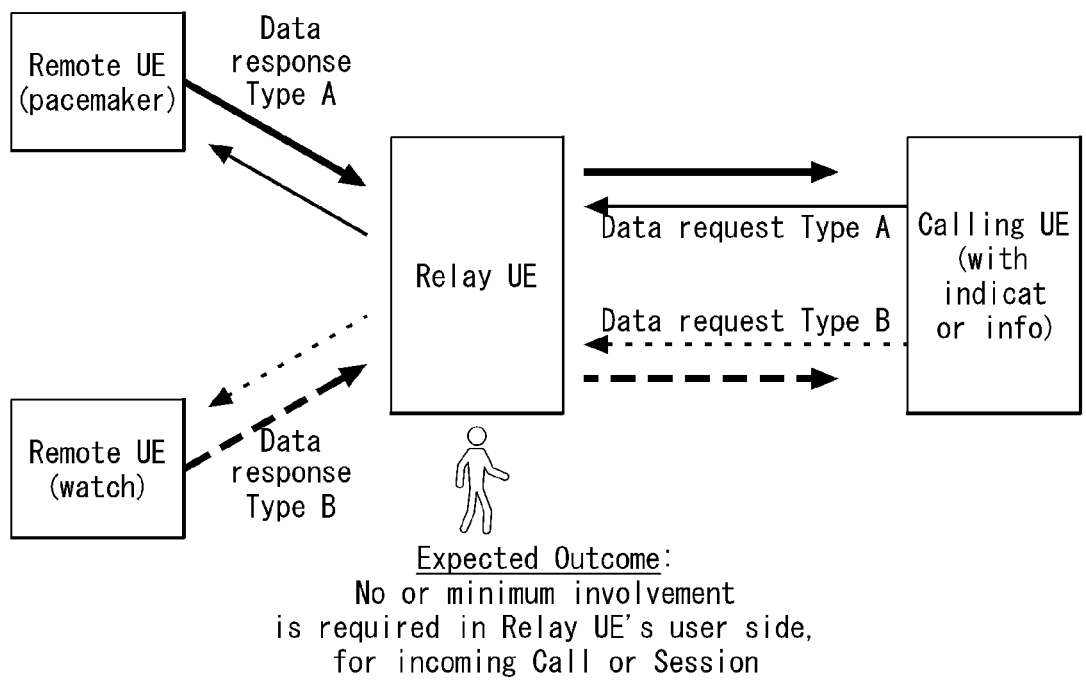

[Figure 11]
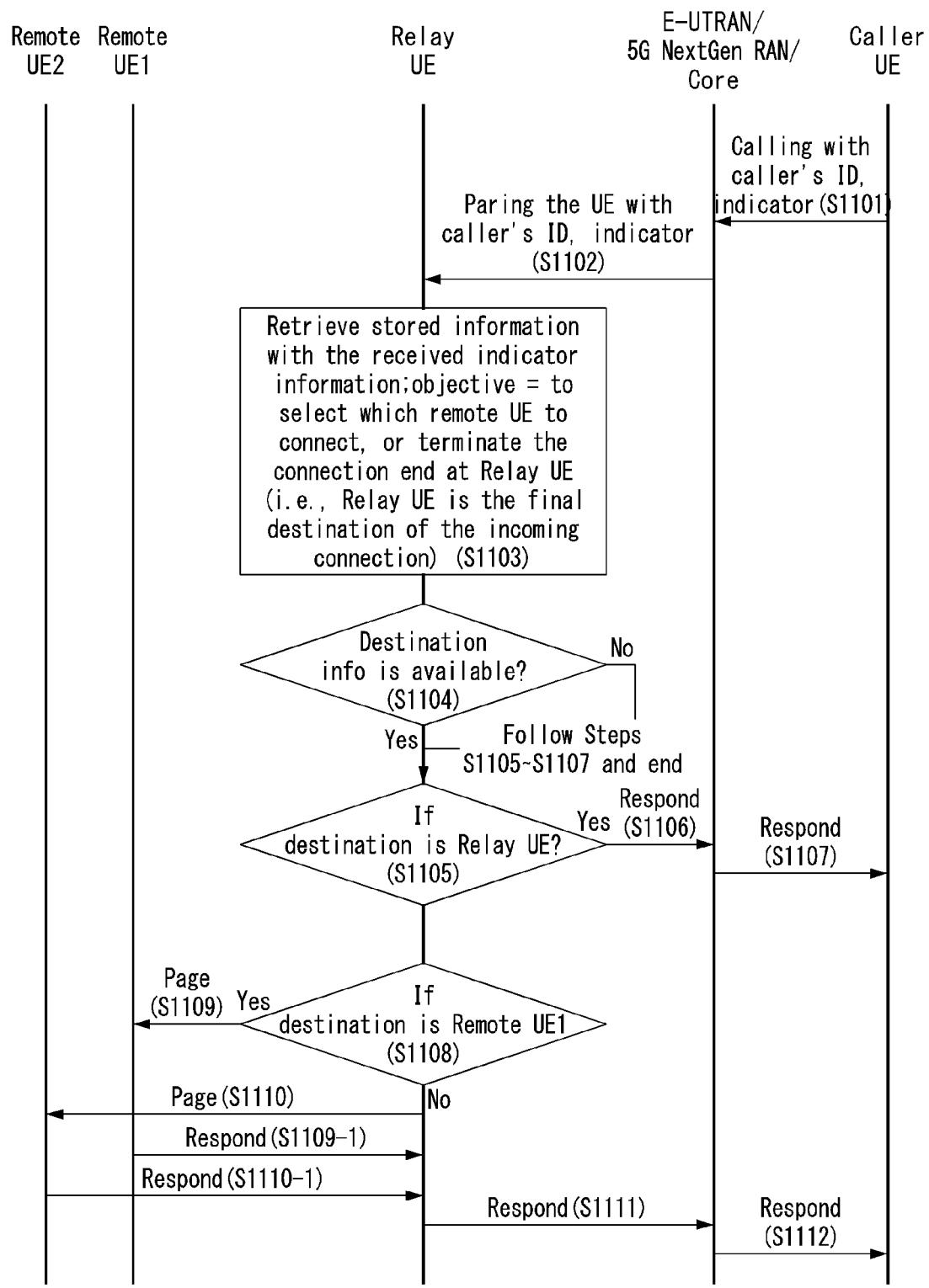

[Figure 12]
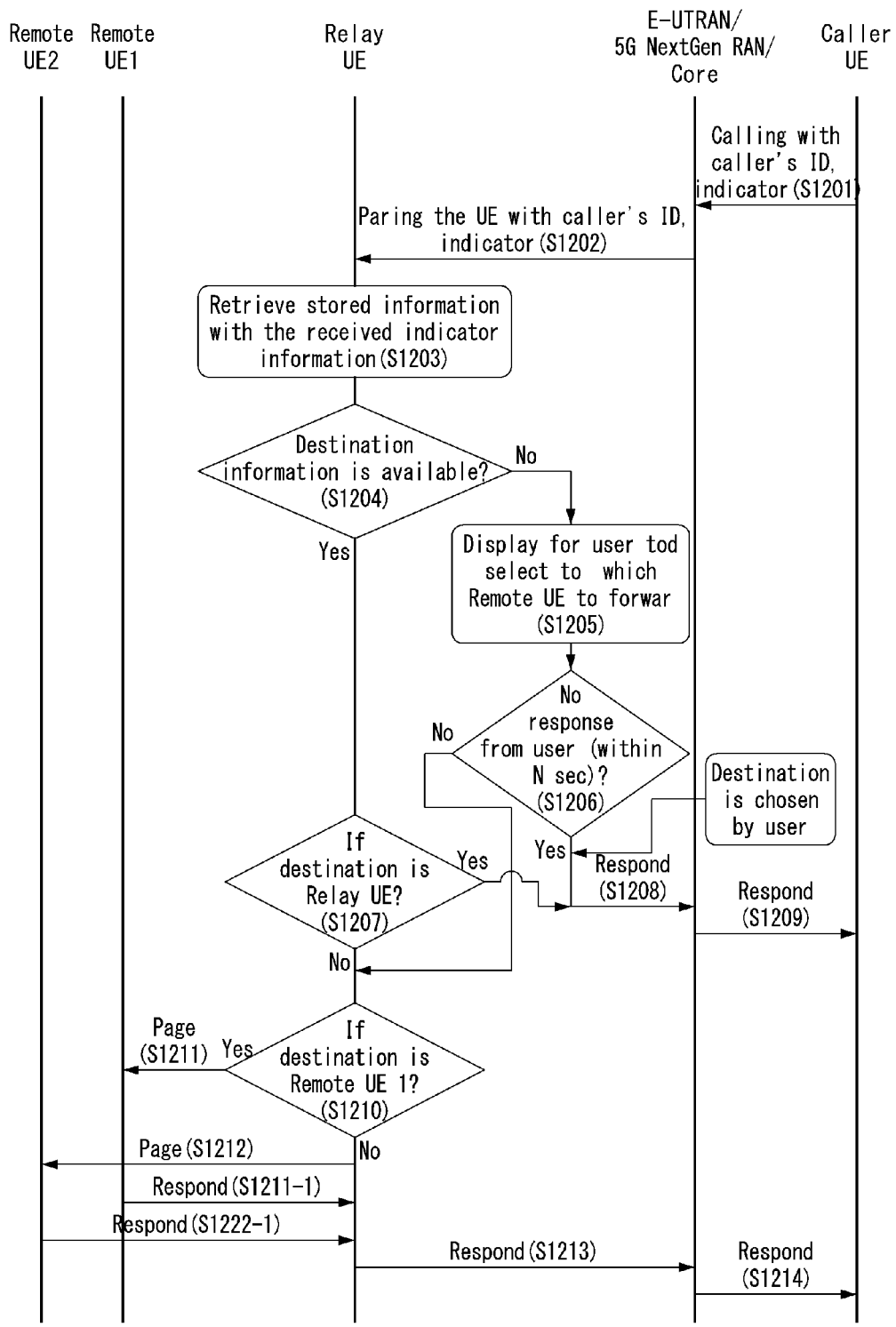

[Figure 13]
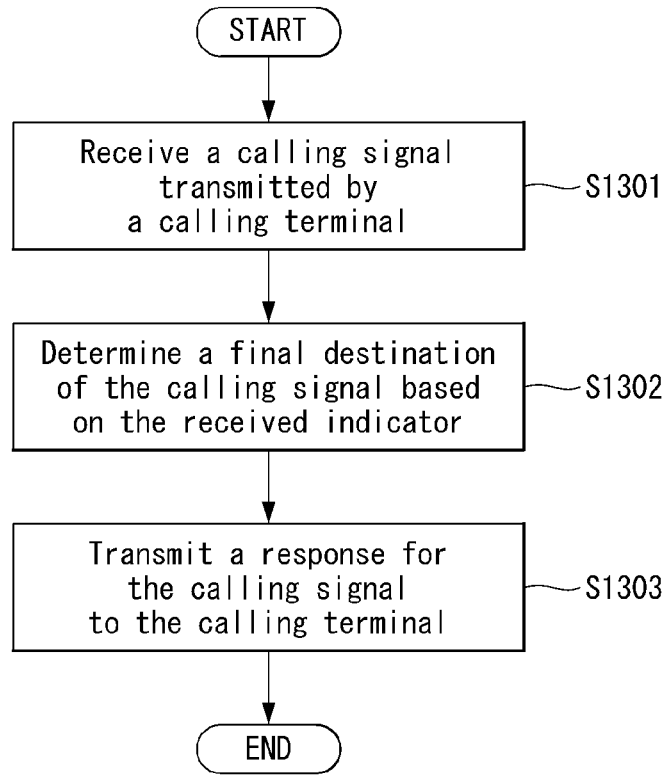
[Figure 14]
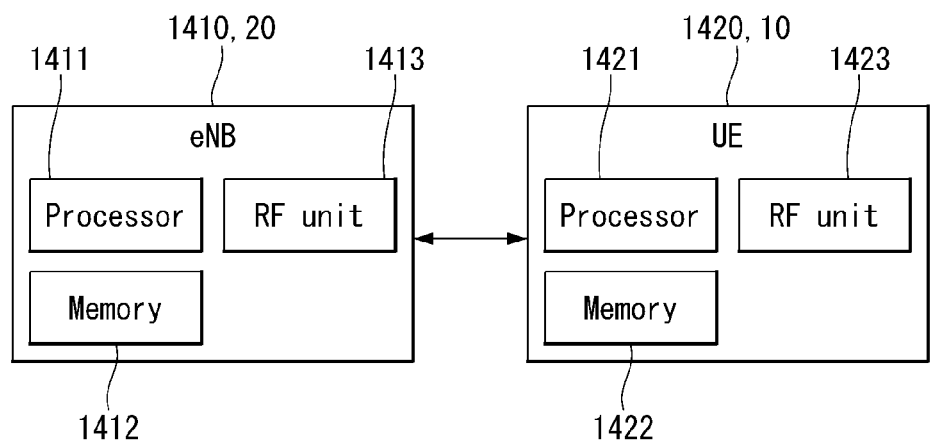

METHOD AND APPARATUS FOR PERFORMING PROSE COMMUNICATION IN A WIRELESS COMMUNICATION SYSTEM

CROSS-REFERENCE TO RELATED APPLICATIONS

This application is the National Stage filing under 35 U.S.C. 371 of International Application No. PCT/KR2017/013198, filed on Nov. 20, 2017, which claims the benefit of U.S. Provisional Application No. 62/423,772, filed on Nov. 18, 2016, the contents of which are all hereby incorporated by reference herein in their entirety.

TECHNICAL FIELD

This specification relates to a method and apparatus for performing ProSe (Proximity Service) communication in a wireless communication.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing demand of data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

SUMMARY OF INVENTION

Technical Problem

The present specification provides a method for transmitting calling signal to remote UE(s) using a relay UE.

Objects to be achieved in this specification are not limited to the aforementioned advantages, and those skilled in the art to which the present invention pertains may evidently understand other objects from the following description.

Technical Solution

In this specification, a method for performing ProSe (Proximity Service) communication using a relay terminal in a wireless communication system, the method performed by the relay terminal, comprising: receiving a calling signal transmitted by a calling terminal, wherein the calling signal includes an identifier (ID) of the calling terminal and an indicator, wherein the indicator is indication information indicating which terminal is final destination; determining the final destination of the calling signal based on the received indicator; and transmitting a response for the calling signal to the calling terminal.

Furthermore, in this specification, the method further comprises checking whether information related to a destination of the calling signal is available, wherein the step of determining is performed if the information related to the destination is available.

Furthermore, in this specification, the method further comprises transmitting the calling signal to a remote terminal if the determined final destination is the remote terminal.

Furthermore, in this specification, the method further comprises receiving a response from the remote terminal.

Furthermore, in this specification, the step of transmitting the calling signal to the remote terminal comprises determining one or more remote terminals corresponding to the indicator among a plurality of remote terminals; and transmitting the calling signal to the determined one or more remote terminals.

Furthermore, in this specification, the method further comprises displaying display information for allowing the calling signal to be transmitted to a remote terminal by a user's input if the information related to the destination is not available.

Furthermore, in this specification, the method further comprises checking whether the user's input has been received for a specific time.

Furthermore, in this specification, if the user's input is received, the calling signal is transmitted to the remote terminal corresponding to the received user's input, and if the user's input is not received, the response for the calling signal is transmitted to the calling terminal.

Furthermore, in this specification, a relay terminal for performing ProSe (Proximity Service) communication using the relay terminal in a wireless communication system, comprising: a radio frequency (RF) unit for transceiving a radio signal; and a processor functionally connected to the RF unit, wherein the processor is configured to perform: receiving a calling signal transmitted by a calling terminal, wherein the calling signal includes an identifier (ID) of the calling terminal and an indicator, wherein the indicator is indication information indicating which terminal is final destination; determining the final destination of the calling signal based on the received indicator; and transmitting a response for the calling signal to the calling terminal.

Advantageous Effects

The present specification can provide information related to neighboring V-UEs obtained through a V2X message with a PSAP via an eCall system.

The present specification has an effect of transmitting a calling signal to a remote UE through ProSe communication or Device-to-Device (D2D) communication by utilizing a relay UE.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 illustrates an example of control plane when PC5 is used.

FIG. 4 illustrates an example of control plane when non-3GPP is used.

FIG. 5 illustrates an example of user plane when PC5 is used.

FIG. 6 illustrates an example of user plane when non-3GPP is used.

FIG. 7a illustrates user-Plane protocol stack for sidelink communication to which the present invention may be applied.

FIG. 7b illustrates control-Plane protocol stack for SBCCH to which the present invention may be applied.

FIG. 8 illustrates control-Plane protocol stack for one-to-one sidelink communication to which the present invention may be applied.

FIG. 9 illustrates an example of call forwarding to Remote UE in Relay UE.

FIG. 10 illustrates an example of call forwarding to Remote UE in Relay UE, which is proposed according to an embodiment of the present invention.

FIG. 11 is a flowchart illustrating an example of a method for transmitting a calling signal proposed in this specification to a remote UE using a relay UE.

FIG. 12 is a flowchart illustrating another example of a method for transmitting a calling signal proposed in this specification to a remote UE using a relay UE.

FIG. 13 is a flowchart illustrating another example of a method for transmitting a calling signal proposed in this specification to a remote UE using a relay UE.

FIG. 14 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A pro is an evolution of 3GPP LTE-A. 5G NR is a revolution of 3GPP LTE-A that will be implemented by OFDMA or its variants.

For the purposes of the present invention, the following abbreviations apply.

ACK Acknowledgement
AM Acknowledged Mode
AMBR Aggregate Maximum Bit Rate
ARQ Automatic Repeat Request
AS Access Stratum
BCCH Broadcast Control Channel
BCH Broadcast Channel
BM-SC Broadcast and Multicast Service Center
BSR Buffer Status Report
CA Carrier Aggregation
CC Component Carrier
CG Cell Group
CMAS Commercial Mobile Alert Service
CP Cyclic Prefix
CoMP Coordinated Multi Point
C-plane Control Plane
C-RNTI Cell RNTI
CQI Channel Quality Indicator
CRC Cyclic Redundancy Check CRS Cell-specific Reference Signal
DC Dual Connectivity
DCCH DCN Dedicated Core Network
DeNB Donor eNB
DL Downlink
DL SCH Downlink Shared CHannel
DRB Data Radio Bearer
DRX Discontinuous Reception
ECM EPS Connection Management
EMM EPS Mobility Management
eNB E-UTRAN NodeB
EMBMS Enhanced MBMS
EPC Evolved Packet Core
EPS Evolved Packet System
E-RAB E-UTRAN Radio Access Bearer
ETWS Earthquake and Tsunami Warning System
E-UTRA Evolved UTRA
E-UTRAN Evolved UTRAN
FDD Frequency Division Duplex
FDM Frequency Division Multiplexing
GERAN GSM EDGE Radio Access Network
GNSS Global Navigation Satellite System
GSM Global System for Mobile communication
GBR Guaranteed Bit Rate
GP Guard Period
G-RNTI Group RNTI
HARQ Hybrid ARQ
(H)eNB eNB or Home Enb
HO Handover
HPLMN Home Public Land Mobile Network
HSDPA High Speed Downlink Packet Access
ID Identification or Identifier
IP Internet Protocol
LTE Long Term Evolution
LCID Logical Channel ID
MAC Medium Access Control
MBMS Multimedia Broadcast Multicast Service
MBMS GW MBMS Gateway
MBR Maximum Bit Rate
MBSFN Multimedia Broadcast multicast service Single Frequency Network
MCCH Multicast Control Channel
MCE Multi-cell/multicast Coordination Entity
MCG Master Cell Group
MCH Multicast Channel
MCS Modulation and Coding Scheme
MeNB Master eNB
MGW Media Gateway
MIB Master Information Block
MIMO Multiple Input Multiple Output
MME Mobility Management Entity
MNO Mobile Network Operator
MRB MBMS Radio Bearer
M-RNTI MBMS RNTI
MTCH Multicast Traffic Channel
MTC Machine-Type Communications
NACK Negative Acknowledgement
NAS Non-Access Stratum
OFDM Orthogonal Frequency Division Multiplexing
OFDMA Orthogonal Frequency Division Multiple Access
O&M Operations and Maintenances
P-GW PDN Gateway
PAPR Peak-to-Average Power Ratio
PCell Primary Cell
PDCCH Physical Downlink Control CHannel
PDCP Packet Data Convergence Protocol
PDN Packet Data Network
PDSCH Physical Downlink Shared CHannel
PDU Protocol Data Unit
PHY Physical layer
PLMN Public Land Mobile Network
ProSe Proximity based Services
PSCell Primary SCell
PUCCH Physical Uplink Control CHannel
PUSCH Physical Uplink Shared CHannel
PWS Public Warning System
QoS Quality of Service
RACH Random Access Channel
RB Radio Bearer
RF Radio Frequency
RLC Radio Link Control
RN Relay Node
RNC Radio Network Controller
RNL Radio Network Layer
RNTI Radio Network Temporary Identifier
ROHC Robust Header Compression
RRC Radio Resource Control
RRM Radio Resource Management
S-GW Serving Gateway
S1-MME S1 for the control plane
SCC Secondary Component Carrier
SCell Secondary Cell
SCG Secondary Cell Group
SeNB Secondary eNB
SI System Information
SIB System Information Block
S1-U S1 for the user plane
SAE System Architecture Evolution
SAP Service Access Point
SC-FDMA Single Carrier-Frequency Division Multiple Access
SC-PTM Single Cell Point To Multipoint
SCTP Stream Control Transmission Protocol
SDF SFN System Frame Number
SDU Service Data Unit
S-GW Serving GateWay
SRB Signalling Radio Bearer
TCP Transmission Control Protocol
TDD Time Division Duplex
TDM Time Division Multiplexing
TMGI Temporary Mobile Group Identity
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
Vehicle-to-Infrastructure
V2N Vehicle-to-Network
V2P Vehicle-to-Pedestrian
V2V Vehicle-to-Vehicle
V2X Vehicle-to-Everything
WLAN Wireless Local Area Network
X2 GW X2 GateWay For the purposes of the present invention, the following terms and definitions apply.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

Communication Range: The range between UEs and/or between UEs and eNBs such that ProSe Communication is possible.

Dual Connectivity: mode of operation of a UE in RRC_CONNECTED, configured with a Master Cell Group and a Secondary Cell Group.

EPC Path: the user plane communication path through EPC.

E-RAB: an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

eRelay-UE: a Layer 2 relay in which a UE supports Indirect 3GPP Communication between an eRemote-UE and the 3GPP network, using E-UTRA, WLAN or Bluetooth between the eRemote-UE and the relay.

eRemote-UE: a UE that is connected to a network using an Indirect 3GPP Communication.

Evolved ProSe Remote UE: is a UE that is connected to an Evolved ProSe UE-to-Network Relay using an Indirect 3GPP Communication.

Handover: procedure that changes the serving cell of a UE in RRC_CONNECTED.

Indirect 3GPP Communication: The signalling and communication between a UE and 3GPP network, where there is an eRelay-UE between the eRemote-UE and the 3GPP network.

Make-Before-Break HO/SeNB change: maintaining source eNB/SeNB connection after reception of RRC message for handover or change of SeNB before the initial uplink transmission to the target eNB during handover or change of SeNB.

Master Cell Group: in dual connectivity, a group of serving cells associated with the MeNB, comprising of the PCell and optionally one or more SCells.

Master eNB: in dual connectivity, the eNB which terminates at least S1-MME.

MCG bearer: in dual connectivity, a bearer whose radio protocols are only located in the MeNB to use MeNB resources only.

Open ProSe Discovery: is ProSe Discovery without explicit permission from the ProSe-enabled UE being discovered.

Power saving mode: mode configured and controlled by NAS that allows the UE to reduce its power consumption.

ProSe Broadcast Communication: a one-to-all ProSe Communication, between all authorized UEs in proximity, by means of a common ProSe Communication Path established between these UEs.

ProSe E-UTRA Communication: a ProSe Communication using a ProSe E-UTRA Communication path.

ProSe-assisted WLAN direct communication: a ProSe Communication using a ProSe-assisted WLAN direct communication path.

ProSe Communication path: the communication path supporting ProSe Communication. The communication path of a ProSe E-UTRA Communication (ProSe E-UTRA Communication path) could be established e.g. directly between the ProSe-enabled UEs using E-UTRA, or routed via local eNB(s). The communication path of a ProSe-assisted WLAN direct communication (ProSe-assisted WLAN direct communication path) is established directly between the ProSe-enabled UEs using WLAN.

ProSe Group Communication: a one-to-many ProSe Communication, between more than two UEs in proximity, by means of a common ProSe Communication path established between the UEs.

ProSe-enabled Network: a network that supports ProSe Discovery and/or ProSe Communication.

ProSe UE-to-Network Relay: a UE that provides functionality to support connectivity to the network for Remote UE(s).

ProSe UE-to-Network Relay Selection: Process of identifying a potential ProSe UE—to Network Relay, which can be used for connectivity services (e.g. to communicate with a PDN).

ProSe UE-to-Network Relay Reselection: process of changing previously selected ProSe UE-to-Network Relay and identifying potential a new ProSe UE-to-Network Relay, which can be used for connectivity services (e.g. to communicate with PDN).

Public Safety ProSe Carrier: carrier frequency for public safety sidelink communication and public safety sidelink discovery.

ProSe UE-to-UE Relay: is a form of relay in which a Public Safety ProSe-enabled UE acts as a ProSe E-UTRA Communication relay between two other Public Safety ProSe-enabled UEs.

ProSe-enabled Network: a network that supports ProSe Discovery and/or ProSe Communication.

Remote UE: a ProSe-enabled Public Safety UE, that communicates with a PDN via a ProSe UE-to-Network Relay.

SCG bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Sidelink: UE to UE interface for sidelink communication, V2X sidelink communication and sidelink discovery.

Sidelink communication: AS functionality enabling ProSe Direct Communication, between two or more nearby UEs, using E-UTRA technology but not traversing any network node. The terminology "sidelink communication" without "V2X" prefix only concerns PS unless specifically stated otherwise.

Split bearer: in dual connectivity, a bearer whose radio protocols are located in both the MeNB and the SeNB to use both MeNB and SeNB resources.

V2X sidelink communication: AS functionality enabling V2X Communication as defined in TS 23.285 [72], between nearby UEs, using E-UTRA technology but not traversing any network node.

FIG. 1 is a view illustrating an Evolved Packet System which is associated with the Long Term Evolution (LTE) system to which the present invention may be applied. The LTE system aims to provide seamless Internet Protocol (IP) connectivity between UE 10 and a pack data network (PDN), without any disruption to an end user's application during mobility. While the LTE system encompasses the evolution of the radio access through a Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one BS 20 which provides a control plane and a user plane to UE 10. The UE 10 may be fixed or mobile, and may be referred to as another terminology, such as an MS, a UT, an SS, an MT or a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

ProSe UE-to-Network Relay

Definitions eRelay-UE: a Layer 2 relay in which a UE supports Indirect 3GPP Communication between an eRemote-UE and the 3GPP network, using E-UTRA, WLAN or Bluetooth between the eRemote-UE and the relay.

eRemote-UE: a UE that is connected to a network using an Indirect 3GPP Communication.

Indirect 3GPP Communication: The signalling and communication between a UE and 3GPP network, where there is an eRelay-UE between the eRemote-UE and the 3GPP network.

Architecture

The eRelay-UE is a Layer 2 relay and the eRemote-UE is visible to the network.

The eNB terminates the S1-MME and S1-U interfaces of the eRemote-UE.

The NAS signalling from the eRemote-UE is sent to MME using an Indirect 3GPP Communication via an eRelay-UE.

The PC5 user plane and LTE-Uu user plane of eRelay-UE are used to transport user data between eRemote-UE and core network.

An eRelay-UE, which supports only Layer 2, does not serve Remote UEs.

A ProSe UE-to-Network Relay does not serve eRemote-UEs.

The eRemote-UE has its own PDN Connections to the network handled by its own NAS signalling.

The eRelay-UE is in ECM-CONNECTED state when any eRemote-UE(s) served by this eRelay-UE is in ECM-CONNECTED state.

The eRemote-UE's E-RAB part of the EPS Bearer is adapted for relaying.

The discovery method, i.e. via 3GPP or Non-3GPP access, the eRemote-UE uses to discover an eRelay-UE is up to UE implementation.

It is assumed that CIoT EPS Optimizations are supported since the NAS is terminated in the eRemote-UE it is transparent to eRelay-UE.

The architecture needs to meet the following requirements:

The eRelay-UE provides support for both public safety and commercial scenarios and for regulatory requirements.

Support the scenarios where the eRemote-UE is in or out of the E-UTRAN coverage.

Support the scenarios where the eRemote-UE and eRelay-UE D2D connection is via a non-3GPP access.

ProSe Relay describes the scenario where a given UE acts as a communication relay for one or more UEs.

Pre-Conditions

An operator offers a service, which makes use of the ProSe feature.

Officer A, Officer B, and Officer C use ProSe-enabled public safety UEs.

Officer B's UE has a relay capability allowing it to receive and re-transmit ProSe Communications.

Officer A, Officer B, and Officer C are subscribed to a Public Safety service that allows them to use ProSe.

Officer A's UE, Officer B's UE, and Officer C's UE have each been configured to belong to communications group X.

Officer A's UE is within transmission range of Officer B's UE, and Officer B's UE is within transmission range of Officer C's UE, but Officer C's UE is not within transmission range of Officer A's UE.

Officers A, B and C's UEs may or may not be in E-UTRAN coverage.

Service Flows

Officer A wants to communicate with Officer B and Officer C in communications group X via ProSe Group Communications.

Officer B enables his/her UE to act as a relay for ProSe Group Communications.

Officer A's UE transmits a message to Officer B's UE using ProSe Group Communications.

Officer B's UE relays (receives and then re-transmits) the communication from Officer A's UE to Officer C's UE, all using ProSe Group Communications.

Officer B continues to act as a ProSe Group Communications relay until Officer C is back within transmission range of Officer A and Officer B.

Control and User Plane Stacks

FIG. 3 illustrates an example of control plane when PC5 is used.

FIG. 4 illustrates an example of control plane when non-3GPP is used.

FIG. 5 illustrates an example of user plane when PC5 is used.

FIG. 6 illustrates an example of user plane when non-3GPP is used.

Support for Sidelink Communication

Sidelink communication is a mode of communication whereby UEs may communicate with each other directly over the PC5 interface. This communication mode is supported when the UE is served by E-UTRAN and when the UE is outside of E-UTRA coverage.

Only those UEs authorized to be used for public safety operation may perform sidelink communication.

In order to perform synchronization for out of coverage operation UE(s) may act as a synchronization source by transmitting SBCCH and a synchronization signal. SBCCH carries the most essential system information needed to receive other sidelink channels and signals.

SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission.

There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data.

Sidelink control information indicates a Layer 1 ID and characteristics of the transmissions (e.g., an MCS, the location of resource(s) for a Sidelink Control period, and timing alignment).

The UE performs transmission and reception over Uu and PC5 with the following decreasing priority order in case Sidelink Discovery Gap is not configured:

Uu transmission/reception (highest priority);
PC5 sidelink communication transmission/reception;
PC5 sidelink discovery announcement/monitoring (lowest priority).

The UE performs transmission and reception over Uu and PC5 with the following decreasing priority order in case Sidelink Discovery Gap is configured:

Uu transmission/reception for RACH;
PC5 sidelink discovery announcement during a Sidelink Discovery Gap for transmission;
Non-RACH Uu transmission;
PC5 sidelink discovery monitoring during a Sidelink Discovery Gap for reception;
Non-RACH Uu reception;
PC5 sidelink communication transmission/reception.

(2) Radio Protocol Architecture

Hereinafter, the UE radio protocol architecture for sidelink communication is given for the user plane and the control plane.

User Plane

FIG. 7a shows the protocol stack for the user plane, where PDCP, RLC and MAC sublayers (terminate at the other UE) perform the functions listed for the user plane.

FIG. 7a illustrates user-Plane protocol stack for sidelink communication to which the present invention may be applied.

The Access Stratum protocol stack in the PC5 interface consists of PDCP, RLC, MAC and PHY as shown below in FIG. 7a.

User plane details of sidelink communication:
There is no HARQ feedback for sidelink communication;
RLC UM is used for sidelink communication;
A receiving UE needs to maintain at least one RLC UM entity per transmitting peer UE;
A receiving RLC UM entity used for sidelink communication does not need to be configured prior to reception of the first RLC UMD PDU;
ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

Control Plane

A UE does not establish and maintain a logical connection to receiving UEs prior to one-to-many a sidelink communication.

Higher layer establishes and maintains a logical connection for one-to-one sidelink communication including ProSe UE-to-Network Relay operation.

FIG. 7b illustrates control-Plane protocol stack for SBCCH to which the present invention may be applied.

The Access Stratum protocol stack for SBCCH in the PC5 interface consists of RRC, RLC, MAC and PHY as shown below in FIG. 7b.

The control plane for establishing, maintaining and releasing the logical connection for one-to-one sidelink communication is shown in FIG. 8.

FIG. 8 illustrates control-Plane protocol stack for one-to-one sidelink communication to which the present invention may be applied.

Sidelink Communication Via ProSe UE-to-Network Relay

A ProSe UE-to-Network Relay provides a generic L3 forwarding function that can relay any type of IP traffic between the Remote UE and the network. One-to-one and one-to-many sidelink communications are used between the Remote UE(s) and the ProSe UE-to-Network Relay. For both Remote UE and Relay UE only one single carrier (i.e., Public Safety ProSe Carrier) operation is supported (i.e., Uu and PC5 should be same carrier for Relay/Remote UE). The Remote UE is authorised by upper layers and can be in-coverage of the Public Safety ProSe Carrier or out-of-coverage on any supported carriers including Public Safety ProSe Carrier for UE-to-Network Relay discovery, (re) selection and communication. The ProSe UE-to-Network Relay is always in-coverage of EUTRAN. The ProSe UE-to-Network Relay and the Remote UE perform sidelink communication and sidelink discovery.

The eNB controls whether the UE can act as a ProSe UE-to-Network Relay:

If the eNB broadcast any information associated to ProSe UE-to-Network Relay operation, then ProSe UE-to-Network Relay operation is supported in the cell;

The eNB may provide:

Transmission resources for ProSe UE-to-Network Relay discovery using broadcast signalling for RRC_IDLE state and dedicated signalling for RRC_CONNECTED state;

Reception resources for ProSe UE-to-Network Relay discovery using broadcast signalling;

The eNB may broadcasts a minimum and/or a maximum Uu link quality (RSRP) threshold(s) that the ProSe UE-to-Network Relay needs to respect before it can initiate a UE-to-Network Relay discovery procedure. In RRC_IDLE, when the eNB broadcasts transmission resource pools, the UE uses the threshold(s) to autonomously start or stop the UE-to-Network Relay discovery procedure. In RRC_CONNECTED, the UE uses the threshold(s) to determine if it can indicate to eNB that it is a Relay UE and wants to start ProSe UE-to-Network Relay discovery;

If the eNB does not broadcast transmission resource pools for ProSe-UE-to-Network Relay discovery, then a UE can initiate a request for ProSe-UE-to-Network Relay discovery resources by dedicated signalling, respecting these broadcasted threshold(s).

If the ProSe-UE-to-Network Relay is initiated by broadcast signalling, it can perform ProSe UE-to-Network Relay discovery when in RRC_IDLE. If the ProSe UE-to-Network Relay is initiated by dedicated signalling, it can perform relay discovery as long as it is in RRC_CONNECTED.

A ProSe UE-to-Network Relay performing sidelink communication for ProSe UE-to-Network Relay operation has to be in RRC_CONNECTED. After receiving a layer-2 link establishment request or TMGI monitoring request (upper layer message) from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The remote UE can decide when to start monitoring for ProSe UE-to-Network Relay discovery. The Remote UE can transmit ProSe UE-to-Network Relay discovery solicitation messages while in RRC_IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide, transmission resources using broadcast or dedicated signalling and reception resources using broadcast signalling for ProSe UE-to-Network Relay Operation. The Remote UE stops using ProSe UE-to-Network Relay discovery and communication resources when RSRP goes above the broadcasted threshold.

The Remote UE performs radio measurements at PC5 interface and uses them for ProSe UE-to-Network Relay selection and reselection along with higher layer criterion. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays.

The Remote UE triggers ProSe UE-to-Network Relay reselection when:

PC5 signal strength of current ProSe UE-to-Network Relay is below configured signal strength threshold;

It receives a layer-2 link release message (upper layer message) from ProSe UE-to-Network Relay.

Sidelink Relay UE Operation

This procedure is used by a UE supporting sidelink relay UE operation and involves evaluation of the AS-layer conditions that need to be met in order for upper layers to configure a sidelink relay UE to receive/transmit relay related PS sidelink discovery/relay related sidelink communication. The AS-layer conditions merely comprise of being configured with radio resources that can be used for transmission.

A UE that fulfils the criteria that is configured by higher layers accordingly is acting as a sidelink relay UE.

AS-Conditions for Relay Related Sidelink Communication Transmission by Sidelink Relay UE A UE capable of sidelink relay UE operation shall inform upper layers that it is configured with radio resources that can be used for relay related sidelink communication transmission if the following conditions are met:

1> if in RRC_CONNECTED; and if the UE is configured with commTxResources; and the UE is configured with commTxAllowRelayDedicated set to true;

AS-Conditions for Relay PS Related Sidelink Discovery Transmission by Sidelink Relay UE A UE capable of sidelink relay UE operation shall inform upper layers that it is configured with radio resources that can be used for relay PS related sidelink discovery transmission if the following conditions are met:

1> if in RRC_IDLE; and if the UE's serving cell is suitable; and if SystemInformationBlockType19 includes discConfigPS including discTxPoolPS-Common and discConfigRelay; and if the sidelink relay UE threshold conditions are met;

1> else if in RRC_CONNECTED; and if discTxResourcesPS is configured;

Sidelink Relay UE Threshold Conditions

A UE capable of sidelink relay UE operation shall:

1> if the threshold conditions specified in this section were not met:

2> if neither threshHigh nor threshLow is included in relayUE-Config within SystemInformationBlockType19:

3> consider the threshold conditions to be met (entry);

2> else if threshHigh is not included in relayUE-Config within SystemInformationBlockType19; or the RSRP measurement of the PCell, or the cell on which the UE camps, is below threshHigh by hystMax (also included within relayUE-Config); and 2> if threshLow is not included in relayUE-Config within SystemInformationBlockType19; or the RSRP measurement of the PCell, or the cell on which the UE camps, is above threshLow by hystMin (also included within relayUE-Config):

3> consider the threshold conditions to be met (entry); 1> else:

2> if threshHigh is included in relayUE-Config within SystemInformationBlockType19; and the RSRP measurement of the PCell, or the cell on which the UE camps, is above threshHigh (also included within relayUE-Config); or 2> if threshLow is included in relayUE-Config within SystemInformationBlockType19; and the RSRP measurement of the PCell, or the cell on which the UE camps, is below threshLow (also included within relayUE-Config);

3> consider the threshold conditions not to be met (leave);

Sidelink Remote UE Operation

This procedure is used by a UE supporting sidelink remote UE operation and involves evaluation of the AS-layer conditions that need to be met in order for upper layers to configure a sidelink remote UE to receive/transmit relay related sidelink PS discovery/relay related sidelink communication. The AS-layer conditions merely comprise of being configured with radio resources that can be used for transmission, as well as whether or not having a selected sidelink relay UE.

AS-Conditions for Relay Related Sidelink Communication Transmission by Sidelink Remote UE A UE capable of sidelink remote UE operation shall inform upper layers whether it is configured with radio resources that can be used for relay related sidelink communication transmission if the following conditions are met:

1> if the UE is out of coverage; and is preconfigured with SL-Preconfiguration including discTxPoolList and preconfigRelay;

1> else if in RRC_IDLE; and if the UE's serving cell is suitable; and if SystemInformationBlockType18 includes commTxPoolNormalCommon and commTxAllowRelayCommon; and if SystemInformationBlockType19 includes discConfigRelay; and if the sidelink remote UE threshold conditions are met;

1> else if in RRC_CONNECTED; and if the UE is configured with commTxResources; and the UE is configured with commTxAllowRelayDedicated set to true;

AS-Conditions for Relay PS Related Sidelink Discovery Transmission by Sidelink Remote UE A UE capable of sidelink remote UE operation shall inform upper layers whether it is configured with radio resources that can be used for relay PS related sidelink discovery transmission if the following conditions are met:

1> if the UE is out of coverage; and is preconfigured with SL-Preconfiguration including discTxPoolList and preconfigRelay;

1> else if in RRC_IDLE; and if the UE's serving cell is suitable; and if SystemInformationBlockType19 includes discConfigPS including discTxPoolPS-Common and disc-ConfigRelay; and if the sidelink remote UE threshold conditions are met;

1> else if in RRC_CONNECTED; and if discTxResourcesPS is configured;

Selection and Reselection of Sidelink Relay UE

A UE capable of sidelink remote UE operation that is configured by upper layers to search for a sidelink relay UE shall:

1> if out of coverage on the frequency used for sidelink communication; or

1> if the serving frequency is used for sidelink communication and the RSRP measurement of the cell on which the UE camps (RRC_IDLE)/the PCell (RRC_CONNECTED) is below threshHigh within remoteUE-Config:

2> search for candidate sidelink relay UEs,

2> when evaluating the one or more detected sidelink relay UEs, apply layer 3 filtering across measurements that concern the same ProSe Relay UE ID and using the filterCoefficient in SystemInformationBlockType19 (in coverage) or the preconfigured filterCoefficient (out of coverage), before using the SD-RSRP measurement results;

2> if the UE does not have a selected sidelink relay UE:

3> select a candidate sidelink relay UE which SD-RSRP exceeds q-RxLevMin included in either reselectionInfoIC (in coverage) or reselectionInfoOoC (out of coverage) by minHyst;

2> else if SD-RSRP of the currently selected sidelink relay UE is below q-RxLevMin included in either reselectionInfoIC (in coverage) or reselectionInfoOoC (out of coverage); orif upper layers indicate not to use the currently selected sidelink relay: (i.e. sidelink relay UE reselection):

3> select a candidate sidelink relay UE which SD-RSRP exceeds q-RxLevMin included in either reselectionInfoIC (in coverage) or reselectionInfoOoC (out of coverage) by minHyst;

2> else if the UE did not detect any candidate sidelink relay UE which SD-RSRP exceeds q-RxLevMin included in either reselectionInfoIC (in coverage) or reselectionInfoOoC (out of coverage) by minHyst:

3> consider no sidelink relay UE to be selected;

Sidelink Remote UE Threshold Conditions

A UE capable of sidelink remote UE operation shall:

1> if the threshold conditions were not met:

2> if threshHigh is not included in remoteUE-Config within SystemInformationBlockType19; or 2> if threshHigh is included in remoteUE-Config within SystemInformationBlockType19; and the RSRP measurement of the PCell, or the cell on which the UE camps, is below threshHigh by hystMax (also included within remoteUE-Config):

3> consider the threshold conditions to be met (entry); 1> else:

2> if threshHigh is included in remoteUE-Config within SystemInformationBlockType19; and the RSRP measurement of the PCell, or the cell on which the UE camps, is above threshHigh (also included within remoteUE-Config):

3> consider the threshold conditions not to be met (leave);

The Study of Proximity-based Services identified use cases and scenarios that could be provided by the 3GPP LTE system based on UEs being in proximity of each other.

The normative RAN work on enabling Proximity Services was started in LTE Rel.12 with focus on Public Safety applications.

The following major features were standardized in LTE Rel.12:

Device-to-device discovery in network coverage (both Commercial and Public Safety use cases).

Device-to-device broadcast communication, with higher layers supporting groupcast and unicast communication for within/partial and out of network coverage scenarios mainly targeting Public Safety use cases.

The work on Public Safety services continued in LTE Rel.13 to enable: Type-1 discovery for the partial and outside network coverage scenarios; the L3-based UE-to-Network relaying reusing LTE Rel.12 D2D communication; and basic priority handling mechanisms for D2D communication.

There is a lot of interest to use LTE technology to connect and manage low cost MTC devices. One important example of such low cost devices are wearables, which also have the benefit of almost always being in close proximity to a smartphone that can serve as a relay. In this SI we aim to study the application of D2D, including non-3GPP short-range technologies, to such devices. In particular there are two main aspects to be further enhanced in LTE technology to enable D2D aided wearable and MTC applications:

Enhancement of UE-to-Network relaying functionality. The UE-to-Network relaying architecture in ProSe does not differentiate the traffic of the remote UE from that of the relay UE in the access stratum. This model limits the ability of the network and the operator to treat the remote UE as a separate device, e.g. for billing or security. In particular, the 3GPP security associations never reach end-to-end between the network and the remote UE, meaning that the relay UE has clear text access to the remote UE's communications. UE-to-Network relaying should be enhanced to support end-to-end security through the relay link, service continuity, E2E QoS where possible, efficient operation with multiple remote UEs, and efficient path switching between Uu and D2D air-interfaces. Relaying using D2D can also be based on non-3GPP technologies such as Bluetooth and Wi-Fi. Some enhancements such as service continuity can make relaying more attractive for such technologies in commercial use cases. This can be especially useful to wearables due to their usage patterns with proximity to the user's smartphone, as well as form-factor limitations that may make a direct Uu connection less practical (e.g. limits on battery size). Relaying can enable significant power savings for remote UEs (that are getting their traffic relayed). This is especially true for deep coverage scenarios. One cost effective way of introduce relaying is to use unidirectional D2D links between remote devices and relay devices. In this case, the relay UE is utilised to relay only uplink data from the remote UE. The advantage of this approach is no additional RF capability for D2D reception is added to the remote UE.

Enhancements to enable reliable unicast PC5 link to at least support low power, low rate and low complexity/cost devices. Low cost D2D devices can be enabled by reusing the ideas developed during NB-IoT (Narrow Band-IoT) and eMTC studies, e.g., the NB-IoT/eMTC uplink waveform can be reused for D2D. Such devices will potentially use a single modem for communicating with the Internet/cloud and for communicating with proximal devices. The current PC5 link design inherited from the broadcast oriented design driven by public safety use cases, represents a bottleneck that prevents low power and reliable D2D communication, due to lack of any link adaptation and feedback mechanisms. These shortcomings do not allow achieving target performance metrics for wearable and MTC use cases in terms of power consumption, spectrum efficiency, and device complexity. Reduced power consumption and low complexity are the key attributes of wearable and MTC use cases that are typically characterized by small form factors and long battery lifetime.

This study item aims to evaluate and study the benefits of enhanced UE-to-network relaying, and of using an enhanced form of the LTE sidelink air-interface, for D2D aided services focusing on wearable and MTC applications. In order to enable these use cases, the sidelink air-interface should be optimized for energy efficient communication supporting various data rates.

New Research Activity and Objective in 3GPP:

The objective of the study is to study enhancements to Prose UE-to-network relaying and to the LTE D2D framework for commercial and public safety applications such as wearable devices. It is assumed that evolved Remote UEs can support both WAN and D2D connection, and that evolved Remote UEs have 3GPP subscription credentials. The D2D connection is realized by either LTE sidelink or non-3GPP technology. All non-3GPP technologies should be considered transparent for generic relay architecture over them. The primary objective of the study is to address power efficiency for evolved Remote UEs (e.g. wearable devices). The study item will study following coverage scenarios:

Evolved Remote UE and evolved ProSe UE-to-Network Relay UE are EUTRAN in-coverage.

Evolved ProSe UE-to-Network Relay UE has a Uu connection to the eNB and evolved Remote UE can be in enhanced coverage (enhanced coverage implies that the UE is connecting to the network via NB-IOT or Rel-13 MTC in CE mode).

Evolved ProSe UE-to-Network Relay UE is in EUTRAN coverage and evolved Remote UE is out of coverage of EUTRAN.

Following is the list of objectives for the three identified coverage scenarios:

Study and evaluate a generic Layer 2 evolved UE-to-Network Relay architecture, including methods for the network to identify, address, and reach a evolved Remote UE via an evolved ProSe UE-to-Network Relay UE.

Study the possibility of a common solution supporting the following use cases

UE to network relaying over non-3GPP access (Bluetooth/WiFi).

UE to network relaying over LTE sidelink.

Unidirectional and bidirectional UE to network relay.

Investigate potential impacts to protocol stack, procedure and signalling mechanisms, such as authorization, connection setup, UE mobility, parameter configuration and security, allowing multiple evolved Remote UEs via an evolved ProSe UE-to-Network Relay UE.

Study path selection/switch between the cellular link (Uu air interface) and relay link and provide service continuity and QoS.

Study necessary LTE sidelink enhancements.

Introduce additional evaluation assumptions to the sidelink evaluation methodology defined in TR 36.843 focussing on analysis of wearable use cases.

Identify mechanisms to enable QoS, more efficient, reliable, and/or low complexity/cost & low energy sidelink.

Study additional co-existence issues with adjacent carrier frequencies that may arise due to the new mechanisms identified.

FDD, H(Half)-FDD and TDD should be considered for this work. The impact of sidelink operation on cellular traffic, spectrum and QoS of other cellular services are assumed to be fully controlled by the network.

Co-existence with Rel-13 public safety devices in the same spectrum will be taken into account. There is no need of service continuity between Release 13 and Release 14 public safety UEs. So when (Evolved) Remote UE moves from ProSe UE-to-Network Relay to Evolved ProSe UE-to-Network Relay or vice versa there will be no service continuity.

FIG. 9 illustrates an example of call forwarding to Remote UE in Relay UE.

Referring to FIG. 9, call/session forwarding to Remote UE(s) in Relay UE requires Relay UE's action or user's action of the Relay UE for incoming call/session.

Hereinafter, a call forwarding method to a remote UE using a Relay UE proposed in the present specification will be described.

The calling UE (or Caller UE) shall provide an indicator, at will.

Here, the indicator may indicate information indicating at least one specific remote UE among remote UEs.

That is, the indicator may indicate information capable of identifying a particular remote UE, or may indicate information that can identify an owner that owns the particular remote UE.

If there is no "indication" information received by the Relay UE, the Relay UE shall follow normal procedure (but not the proposed steps).

FIG. 9 represents an example of the normal procedure.

The indication information (or indicator) can be sent when the Mobile Terminating UE is being paged, by the calling user providing indication information (e.g., pressing numbers).

FIG. 10 illustrates an example of call forwarding to Remote UE in Relay UE, which is proposed according to an embodiment of the present invention.

Specifically, FIG. 10 illustrates context-aware call/session forwarding to Remote UE(s) in Relay UE using caller UE's indication information for incoming call/session.

FIG. 11 is a flow diagram illustrating one example of a method for transmitting a calling signal to a remote UE by using a relay UE according to the present invention.

FIG. 11 illustrates a method for transmitting a calling signal transmitted from a caller UE to a remote UE by using a relay UE without involving user interaction.

FIG. 11 assumes a situation in which two remote UEs are involved but may also be applied to the case requiring more than two remote UEs.

First, a caller UE transmits a calling signal (or calling) to a relay UE through a wireless communication network.

At this time, the wireless communication network (for example, E-UTRAN/5G NextGen RAN/Core) may include an eNB or may be interpreted to have the same meaning as the eNB.

In this document, a wireless communication network is assumed to have the same meaning as an eNB for the convenience of descriptions, and in what follows, a wireless communication network is denoted as an 'eNB'.

In other words, the caller UE may transmit a calling signal to an eNB (S1101), and the eNB may transmit a received calling signal to a relay UE (S1102).

The calling signal includes a caller ID (Identifier) and an indicator (or indication information) indicating one or more specific remote UEs from among remote UEs.

The indicator may be used to identify a specific remote UE or represent information for identifying a user owning the specific remote UE.

Also, the calling signal may include a plurality of indicators.

In other words, in case the calling signal includes a plurality of indicators, the calling signal may be transmitted to a plurality of remote UEs through the relay UE.

Also, one indicator may be mapped to a plurality of remote UEs.

For example, the indicator indicating 'k' may be mapped to remote UE 1 and remote UE 2.

Also, a mapping table between the indicator and the remote UE may contain predetermined information or may be received through the wireless communication network.

Afterwards, the relay UE searches for stored information by using the received indicator S1103.

In other words, the relay UE searches stored information for the information related to the remote UE corresponding to the received indicator.

At this time, as described above, the indicator is intended to be used for the relay UE to select which remote UE to be connected to the caller UE or to be used to determine whether a connection end terminates at the relay UE.

In other words, the relay UE may know from the received indicator whether a calling signal indicates the relay UE itself or a remote UE.

Afterwards, the relay checks whether destination information is available S1104.

At this time, the destination information may be available when a calling signal may not be forwarded to the remote UE according as a connection between the relay UE and the remote UE is lost or when a list of remote UEs maintained by the relay UE is not updated even though remote UEs have been added, modified, or deleted.

In the S1104 step, in case the destination information is available, the relay UE checks whether the destination of the calling signal is the relay UE (or whether a received indicator specifies the remote UE) S1105.

In the S1104 step, in case the destination information is not available, the relay UE performs S1105 to S1107 steps to be described later.

In the S1105 step, in case the destination of the calling signal is the relay UE, the relay UE transmits a response corresponding to the calling signal to the caller UE through the wireless communication network S1106, S1107.

In other words, the relay UE transmits the response to the eNB S1106, and the eNB transmits the response to the caller UE S1107.

In the S1105 step, in case the destination is a remote UE rather than the relay UE, the relay UE checks which remote UE corresponds to the destination S1108 and transmits the calling signal to the corresponding remote UE S1109 or S1110.

For example, in case the corresponding remote UE is remote UE 1, the calling signal is transmitted to the remote UE 1.

Afterwards, the relay UE receives a response corresponding to the calling signal from the corresponding remote UE S1109-1 or S1109-2.

Afterwards, the relay UE transmits the received response to the caller UE through the wireless communication network S1111, S1112.

FIG. 12 is a flow diagram illustrating another example of a method for transmitting a calling signal to a remote UE by using a relay UE according to the present invention.

FIG. 12 assumes a situation in which two remote UEs are involved but may also be applied to the case requiring more than two remote UEs.

Different from FIG. 11, FIG. 12 illustrates a method for transmitting a calling signal transmitted from a caller UE to a remote UE by using a relay UE when user interaction is involved.

Since S1201 to S1204 steps are the same as the S1101 to S1104 steps of FIG. 11, and S1207 to S1214 steps are the same as the S1105 to S1112 steps of FIG. 11, detailed descriptions are omitted, but only those parts different from FIG. 11 will be described.

Different from FIG. 11, FIG. 12 illustrates an operation for selecting a remote UE by a user intervention when destination information is unavailable.

In other words, in the S1204 step, in case destination information is unavailable, the relay UE displays a screen for the selection between a relay UE and a remote UE so that the user may determine to which of the relay UE and the remote UE to transmit a calling signal S1205.

Afterwards, the relay UE checks whether there is an input or a response from the user within a predetermined time interval (for example, N sec, where N is a natural number) S1206.

In the S1206 step, in case an input or a response is received from the user within the predetermined time interval, the relay UE performs the S1210 step, while, in case an input or a response is not received from the user within the predetermined time interval, the relay UE performs the S1208 and the S1209 step.

In case the relay UE receives an input indicating that the destination of the calling signal is the relay UE (namely in case the user selects the relay UE as the destination) through the S1206 step, the relay UE transmits a response with respect to the calling signal to the caller UE through the wireless communication network S1208, S1209.

In case the relay UE receives an input indicating that the destination of the calling signal is the remote UE through the S1206 step (namely in case the user selects the remote UE as the destination), the S1210 step is performed.

FIG. 13 is a flowchart illustrating an example of a method for transmitting a calling signal proposed in this specification to a remote UE using a relay UE.

That is, FIG. 13 represents a method for performing ProSe (Proximity Service) communication using a relay UE.

Referring to FIG. 13, the relay UE (or first UE) receives a calling signal transmitted by a calling terminal (or second UE) (S1301) via a network.

Before performing the step S1301, the relay UE receives information related to a destination of the calling signal.

Here, the calling signal includes an identifier (ID) of the calling terminal and an indicator.

Also, the indicator is indication information indicating which terminal is final destination.

Thereafter, the relay UE determines the final destination of the calling signal based on the received indicator (S1302).

Thereafter, the relay UE transmits a response for the calling signal to the calling terminal (S1303).

Additionally, before performing the step S1302, the relay UE can perform below procedure.

That is, the relay UE checks whether information related to a destination of the calling signal is available.

Here, the step S1302 is performed if the information related to the destination is available.

Also, the relay UE can transmits the calling signal to a remote terminal (or third UE) if the determined final destination is the remote terminal, and can receive a response from the remote terminal.

Before performing the step S1303, the relay UE can determine one or more remote terminals corresponding to the indicator among a plurality of remote terminals, and transmit the calling signal to the determined one or more remote terminals.

Also, the relay UE can display display information for allowing the calling signal to be transmitted to a remote terminal by a user's input if the information related to the destination is not available.

Also, before the relay UE display the display information, the relay UE checks whether the user's input has been received for a specific time.

If the user's input is received, the calling signal is transmitted to the remote terminal corresponding to the received user's input.

Or, if the user's input is not received, the response for the calling signal is transmitted to the calling terminal.

General Apparatus to which an Embodiment of the Present Invention May be Applied FIG. 14 is a block diagram illustrating a wireless device in which methods as proposed herein may be implemented.

In this case, the wireless device may be a BS, UE, vehicle UE, a network entity, and the network entity includes at least one of eNB-type RSU or MME.

As shown in FIG. 14, the network entity 1410 and the UE (or the vehicle UE) 1420 include communication units (transmitting/receiving units, RF units, 1413 and 1423), processors 1411 and 1421, and memories 1412 and 1422.

The network entity and the UE may further input units and output units.

The communication units 1413 and 1423, the processors 1411 and 1421, the input units, the output units, and the memories 1412 and 1422 are operatively connected with each other in order to conduct the methods as proposed herein.

The communication units (transmitting/receiving units or RF units, 1413 and 1423), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1411 and 1421 implement functions, procedures, and/or methods as proposed herein. The layers of radio interface protocols may be implemented by the processors.

The processors may be represented as control parts, controllers, control units, or computers.

The memories 1412 and 1422 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

INDUSTRIAL APPLICABILITY

Examples in which the method for performing ProSe communication in a wireless communication system according to an embodiment of the present invention has been applied to 3GPP LTE/LTE-A systems have been described, but the method may be applied to various wireless communication systems in addition to the 3GPP LTE/LTE-A systems.

The invention claimed is:

1. A method for performing, by a relay terminal, ProSe (Proximity Service) communication using the relay terminal and one or more remote terminals wirelessly connected to the relay terminal in a wireless communication system, the method comprising:

receiving information related to a destination of a calling signal from a network;

receiving, from the network, the calling signal including an identifier (ID) of a calling terminal and an indicator, the indicator indicating which terminal is a final destination;

determining whether the information related to the destination of the calling signal is available;

determining the final destination of the calling signal based on the received indicator if the information related to the destination is available;

if the determined final destination is a remote terminal, transmitting the calling signal to the remote terminal;

if the determined final destination is the relay terminal, transmitting a response for the calling signal to the network; and displaying display information for allowing the calling signal to be transmitted to the remote terminal by a user's input if the information related to the destination is not available.

2. The method of claim 1, further comprising:

receiving a response for the calling signal from the remote terminal if the relay terminal transmits the calling signal to the remote terminal.

3. The method of claim 1, wherein the transmitting the calling signal to the remote terminal comprising:

determining at least one remote terminal corresponding to the indicator among a plurality of remote terminals; and transmitting the calling signal to the determined at least one remote terminal.

4. The method of claim 1, further comprising:

checking whether the user's input is received for a specific time.

5. The method of claim 4, wherein if the user's input is received, the calling signal is transmitted to the remote terminal corresponding to the received user's input, and if the user's input is not received, the response for the calling signal is transmitted to the calling terminal.

6. A relay terminal for performing ProSe (Proximity Service) communication in a wireless communication system, comprising:

one or more antenna for transceiving a radio signal; and a processor functionally connected to the one or more antenna, wherein the processor is configured:

to receive information related to a destination of a calling signal from a network;

to receive, from the network, the calling signal including an identifier (ID) of a calling terminal and an indicator, the indicator indicating which terminal is a final destination;

to determine whether the information related to the destination of the calling signal is available;

to determine the final destination of the calling signal based on the received indicator if the information related to the destination is available;

to transmit the calling signal to the remote terminal if the determined final destination is a remote terminal, and terminal;

to transmit a response for the calling signal to the network if the determined final destination is the relay terminal; and to display information for allowing the calling signal to be transmitted to the remote terminal by a user's input if the information related to the destination is not available.

* * * * *